(12) United States Patent
Radulescu

(10) Patent No.: US 6,868,879 B2
(45) Date of Patent: Mar. 22, 2005

(54) TREAD COMPRISING RIBS PROVIDED WITH INCISIONS OF VARYING INCLINATION

(75) Inventor: Robert Radulescu, Perignat-les-Sarlieve (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 211 days.

(21) Appl. No.: 10/145,276

(22) Filed: May 13, 2002

(65) Prior Publication Data

US 2002/0166613 A1 Nov. 14, 2002

(30) Foreign Application Priority Data

May 14, 2001 (FR) .............................................. 01 06353

(51) Int. Cl.[7] .......................... B60C 11/04; B60C 11/12
(52) U.S. Cl. .............. 152/209.23; 152/901; 152/DIG. 3
(58) Field of Search ........................ 152/209.18, 209.23, 152/DIG. 3, 901

(56) References Cited

U.S. PATENT DOCUMENTS

| 2,272,879 | A | * | 2/1942 | Hargraves .............. | 152/209.22 |
| 5,896,905 | A | * | 4/1999 | Lurois ................... | 152/209.23 |
| 6,196,288 | B1 |  | 3/2001 | Radulescu et al. ..... | 152/209.17 |
| 6,202,725 | B1 | * | 3/2001 | Moriya .................. | 152/209.23 |

FOREIGN PATENT DOCUMENTS

| DE | 4107547 | * | 9/1991 |
| DE | 19506697 | * | 8/1996 |
| EP | 0810104 |  | 5/1997 |
| EP | 864448 | * | 9/1998 |
| JP | 3-139404 | * | 6/1991 |
| JP | 10129218 |  | 1/1996 |
| JP | 8-207514 | * | 8/1996 |
| WO | WO 98/26945 | * | 6/1998 |

OTHER PUBLICATIONS

Patent Abstracts of Japan, Publ. No. 10129218, "Pneumatic Tire, and Vulcanizing Die Used in Its Manufacture," May 19, 1998.

* cited by examiner

Primary Examiner—Steven D. Maki
(74) Attorney, Agent, or Firm—Burns, Doane, Swecker & Mathis, L.L.P.

(57) ABSTRACT

A tread (1) for a tire with a preferred rolling direction, the tread having grooves (2) of substantially circumferential orientation which delimit ribs (30, 31, 32, 33, 35), at least one of which is provided close to each of its traverse edges with a plurality of incisions of width smaller than 1.5 mm. The incisions open onto the contact surface of the tread, are essentially parallel to one another, and having a mean inclination $\alpha$ different from zero relative to the direction perpendicular to the rolling surface (S) of the tread. The tread is characterized in that, when viewed in a section plane perpendicular to the rotational axis of the tire, each incision in a given rib, relative to a perpendicular to the contact surface of the rib at the point where the incision intersects the surface, has an inclination which varies through the thickness of the tread, each incision being inclined at an angle $\beta 1$ relative to said perpendicular at its point of intersection with the rolling surface when new, the angle $\beta 1$ being larger than the angle $\alpha$, and at an angle $\beta 2$ at the point of the incision furthest inside the tread, the angle $\beta 2$ being smaller than the angle $\alpha$. The point of the incision furthest inside the tread being located, relative to said perpendicular, such that it is ahead of the point of the incision located on the contact surface of the rib.

8 Claims, 2 Drawing Sheets

TREAD COMPRISING RIBS PROVIDED WITH INCISIONS OF VARYING INCLINATION

BACKGROUND OF THE INVENTION

1. Technical Field of the Invention

The present invention relates to treads for tires designed for fitting on the front axle of vehicles and, more particularly, heavy vehicles, which may be required to travel long distances at sustained speeds.

2. The Related Art

Such tires generally have a carcass reinforcement comprising a plurality of reinforcing elements arranged radially, the carcass reinforcement itself being covered by a crown reinforcement that extends in the circumferential direction. This crown reinforcement is composed of at least two plies superimposed over one another, each ply being formed of a rubber mixture reinforced by a plurality of cords or wires with low extensibility, preferably made of steel, which are arranged parallel to one another in the same ply and are inclined in a direction of at most 40° relative to the circumferential direction, with the cords of each ply being crossed from one ply to the next. The crown reinforcement can be completed, on the one hand, by two half-plies formed of cords with low extensibility which make an angle between 45° and 80° relative to the circumferential direction and, on the other hand, by at least one ply formed of cords, said to be "elastic", which are positioned radially outside the crown plies and whose reinforcing cords make an angle smaller than 40° relative to the circumferential direction.

In addition, the crown reinforcement is covered on its radially outer surface by a tread made of at least one rubber mixture, whose part radially on the outside of the tire forms the rolling surface intended to come into contact with the road during the rolling of said tire.

To obtain satisfactory grip when rolling on a road covered with water, the tread is provided on its external surface, in the case of tires designed for fitting on the front, steering axle of heavy goods vehicles, with a plurality of grooves having substantially circumferential orientation. These grooves form a pattern comprising a plurality of ribs, each rib having a contact surface radially on the outside and side walls that can be substantially perpendicular to the contact surface of the rib or that can make a non-zero taper angle with that surface (undercut geometry). The intersection of each side wall with the contact surface of a rib forms an edge.

During the rolling of tires provided with such treads wear has been observed which is termed "irregular" because it takes place to a greater extent at and close to the edges of the ribs than over the remainder of the contact surface of the ribs. This localized, irregular wear has several disadvantages: besides an unaesthetic appearance, it may necessitate a premature tire change; and such wear also impairs the proper mechanical function of the ribs when the tire is subjected to transverse forces, particularly when taking a bend, since the edges are displaced relative to the contact surface, which surface is consequently proportionally smaller.

To improve the resistance of such treads to irregular wear, U.S. Pat. No. 6,196,288 recommends that a plurality of incisions be made near each edge of each rib, the traces of these incisions on the contact surface being between 4 and 8 mm long and the incisions having a mean, constant inclination within the thickness of the rib of between 5° and 15° relative to a perpendicular to the contact surface.

Although such an arrangement is effective in combating this type of irregular wear, it is found that the mean overall wear of ribs provided with such incisions is increased very considerably compared with the overall wear of ribs without such incisions. Thus, although the wear of each rib becomes more regular, the wear life of the tread is shorter compared with that of a tire whose tread has no such inclined incisions. "Wear life" means the duration of possible use before the tread of a tire becomes so worn during rolling that either the tire must be changed or the tread must be renewed by recapping.

There is therefore a need for a tread structure for tires designed for fitting on the front axle of heavy vehicles, which tread structure includes at least one rib that shows little or no irregular wear and with which the wear rate for all the ribs is substantially the same while the average overall wear rate remains low. These characteristics confer on the tire a wear life that is improved compared with that of tires as disclosed in the aforementioned U.S. Pat. No. 6,196,288.

SUMMARY OF THE INVENTION

In accordance with the invention, a tread is proposed for a tire designed for fitting on the front axle of a heavy goods vehicle, such tire having a preferred rolling direction and including a radial carcass reinforcement covered by a crown reinforcement, the tread comprising grooves of substantially circumferential orientation and of depth H that delimit ribs, each rib being of width B and having a contact surface intended to be in contact with the road and two side faces that intersect the contact surface to form two edges, at least one of the ribs being provided near each of its edges with a plurality of incisions whose orientation is essentially transverse and which open onto the contact surface, their width being smaller than 1.5 mm and their depth E equal to at least 40% of the depth H of the grooves. The incisions are essentially parallel to one another and, within the thickness of the tread, have a non-zero mean inclination $\alpha$ relative to the direction perpendicular to the rolling surface of the tread when new, such that the resultant force exerted by the road on the tread, during rolling in the zone of contact with the road, tends to straighten the incisions towards a mean inclination of zero relative to the perpendicular, the tread being characterized in that, when viewed in a sectional plane perpendicular to the rotation axis of the tire:

each incision in a given rib, relative to a perpendicular to the contact surface of the rib at the point where the incision intersects the surface, has an inclination that varies within the thickness of the tread, each incision being inclined relative to said perpendicular, at its point of intersection with the rolling surface when new, at an angle $\beta 1$, where the angle $\beta 1$ is larger than the angle $\alpha$, and at an angle $\beta 2$ at the point of the incision furthest inside the tread, where the angle $\beta 2$ is smaller than the angle $\alpha$, the point of said incision furthest inside the tread being located, relative to said perpendicular, such that it is ahead of the point of the incision located on the contact surface of the rib.

Viewed in cross-section, a point of an incision located inside the tread is said to be "ahead" of the point of the incision on the rolling surface when new, if a radial plane (a plane containing the rotation axis of the tire) passing through the point of the incision on the rolling surface when new, has to be rotated in the recommended rolling direction, corresponding to the preferred rolling direction of the tire, to bring it up to the point of the incision inside the tread.

Viewed in cross-section, the mean inclination of an incision is given by the angle made by the direction connecting the point of the incision on the rolling surface of the tread and the point furthest inside the tread, taken in the same section plane perpendicular to the rotational axis.

Although tread pattern elements provided with incisions that have variable inclinations are known from the prior art, the prior art variable inclinations do not have the same direction of variation with depth, and consequently do not have the same effect on the wear of the tread, as the incisions according to the present invention. For example, European Application EP 810104 shows a plurality of incisions whose angle of inclination increases with depth; nothing is said, however, regarding the direction in which the incisions are inclined relative to the predetermined rolling direction.

Preferably, the angle β1 is at least equal to 5° and at most equal to 15°.

Preferably, the angle β2 is close or equal to 0° (that is to say, at most equal to 5°), while being different from the angle β1.

Preferably, the width of the incisions is at most equal to 0.4 mm. The walls of rubber mixture that delimit the incisions may be provided with reliefs (hollows, cavities) designed to cooperate with one another to block one wall against the wall opposite, in order to limit relative movement between these walls and thus preserve an appropriate rigidity for each rib.

An "angle close or equal to 0°" means an angle at most equal to 5° (regardless of whether the angle is positive or negative).

Preferably, each incision formed close to the edge of a rib also opens onto a side wall of the rib. It is possible, however, for each incision to be displaced transversely relative to the edge. In that case, the distance separating the end of the trace of the incision on the rolling surface closest to an edge of a rib from that edge is at most equal to 1.5 mm.

The tires according to the invention are intended for fitting on the front axle of a heavy goods vehicle. The mean inclination of the rib incisions is chosen such that the resultant mean forces exerted by the ground on each of the ribs act in a direction tending to straighten the incisions. A more pronounced inclination of the incisions at the rib edges when the tread is new makes it possible to avoid the appearance of the irregular wear at those edges which takes place essentially when the tire is first used, while a smaller inclination after partial wear allows regulation of the overall wear of each rib.

Preferably, the incisions whose inclination varies with depth in the tread are made so as to have a zone of high inclination (at least 10°) over at most one-third of the incision's depth measured perpendicularly to the contact surface. The incisions have depths ranging from 40% to 100% of the height of the ribs at the edge.

The incisions of variable inclination may show a regular and progressive inclination variation, or any other form of variation (for example, linear in sections).

BRIEF DESCRIPTION OF THE DRAWINGS

Other characteristics and advantages of the invention will become apparent from the following description of non-limiting embodiments thereof, taken together with the accompanying drawings, in which.

DESCRIPTION OF EXEMPLARY EMBODIMENTS

Figure 1:
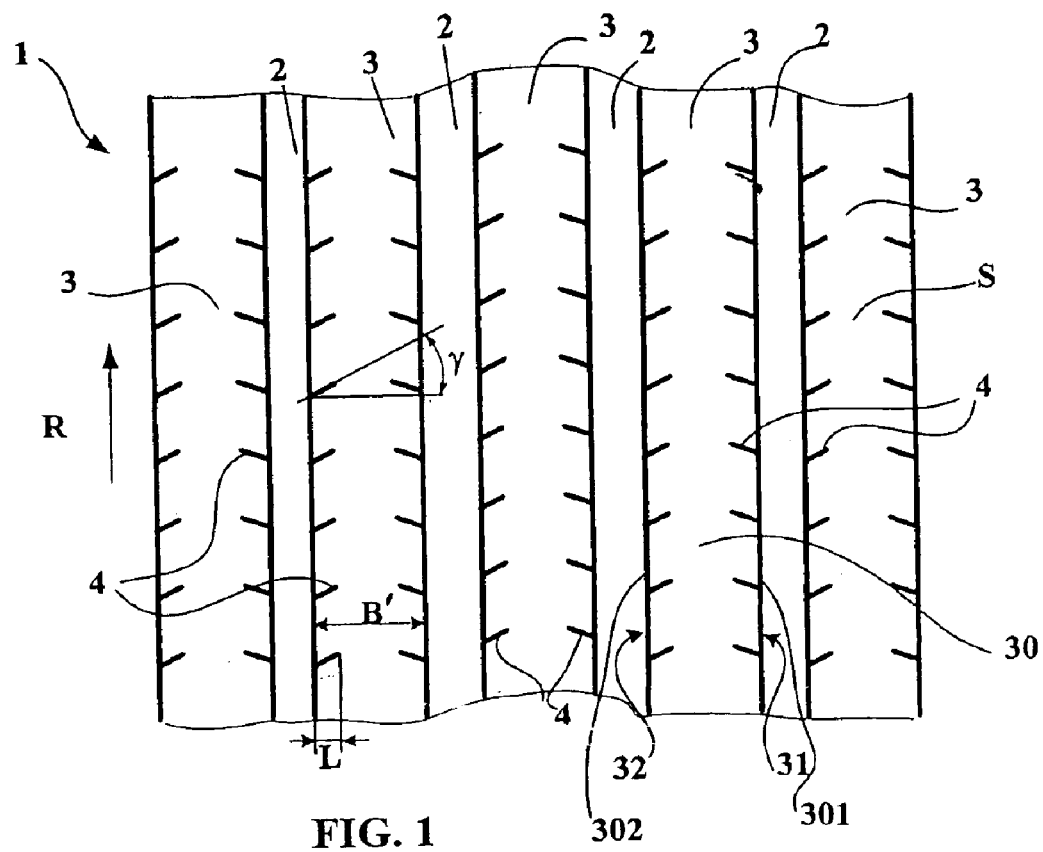
FIG. 1 is a plan view of part of the rolling surface of a tread according to the invention for a heavy goods vehicle.

FIG. 1 illustrates part of the rolling surface S of a tread of a tire 1 according to the invention, the tire size being, for example, 315/80 R 22.5, intended for fitting on the front axle of a heavy vehicle. This tread 1 has four main grooves 2 orientated circumferentially, which grooves having a mean depth of 18 mm. The grooves 2 delimit five transversely spaced ribs 3, and the transversely outermost ribs delimit the contact zone between the tread and the road during the rolling of the tire. Each rib 3 has a contact surface 30 of width equal to 38 mm, which forms part of the rolling surface S of the tread, and two side faces 31, 32 delimited by the grooves 2. The side faces 31, 32 intersect the contact surface 30 along two edges 301, 302, respectively. Each rib 3 is provided in the area of its two edges 301, 302 with a plurality of incisions 4 with mean width equal to 0.4 mm, each incision 4 opening onto the contact surface 30 and onto only one of the side faces 31 or 32. The incisions 4 have traces on the contact surface 30 whose lengths are in this case equal to 4.5 mm.

Figure 2:
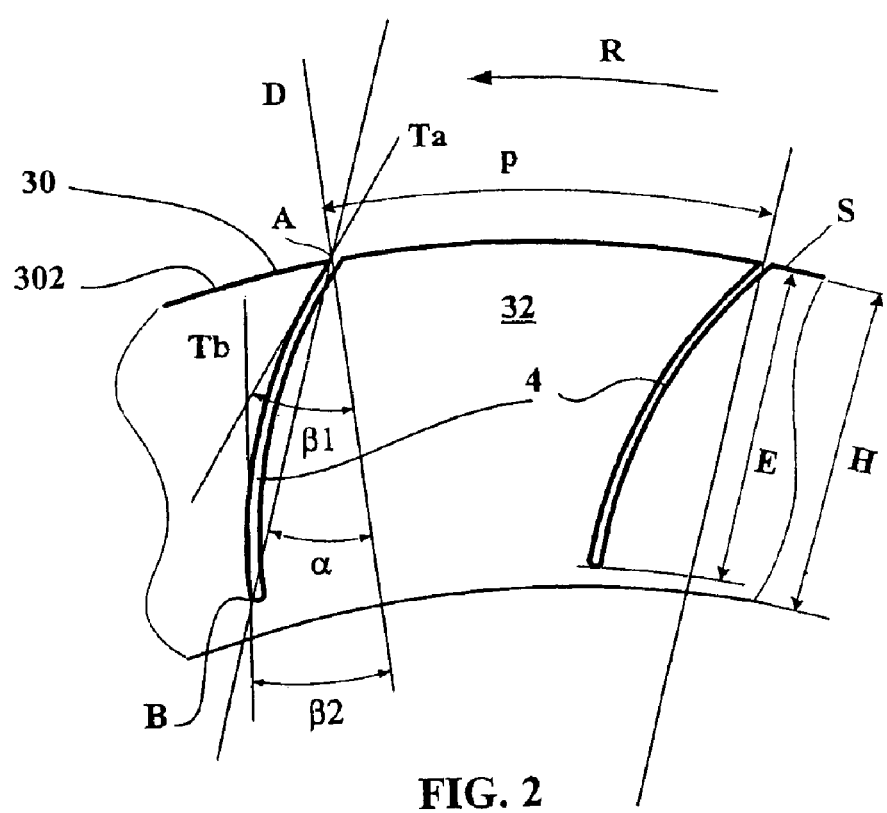
FIG. 2 shows a side face of a rib of the tread shown in FIG. 1.

Relative to a perpendicular to the contact surface 30 at the point where the incision intersects that surface, each of the incisions 4 has an inclination that varies within the thickness of the tread, as shown in FIG. 2.

In FIG. 2, which shows the side face 302 of a rib 3 of the tread in FIG. 1, the traces of the incisions 4 can be seen extending between the contact surface 30 and a depth E equal to 14 mm (or essentially 77% of the depth H of the grooves 2 that delimit the rib 3).

Between the point A where its trace on the side face 32 intersects the edge 302 and the point B, the point furthest inside the tread, each incision 4 has an orientation that makes an angle α, here equal to 7°, relative to the perpendicular to the contact surface 30 at the point A.

At the level of the edge 302, each incision 4 has a trace whose tangent Ta makes an angle β1, in the present case equal to 10°, relative to the perpendicular D. At the point B, the tangent Tb to the trace of the incision makes an angle β2, in the present case equal to 4°, relative to the same perpendicular D.

The mean interval p between the incisions, whose inclination varies within the thickness of the tread, is constant for each rib in the present case, but could be different depending on the rib considered. The mean interval p is preferably chosen at least equal to 4 mm and at most equal to 10 mm; in the present case, it is equal to 5 mm.

These incisions whose inclination varies with depth have on the rolling surface S a trace that forms an angle γ equal, in this example, to 15° (this angle being measured relative to a direction perpendicular to the rolling direction and corresponding to the transverse or axial direction of the tire). As shown in FIG. 1, the traces of the incisions on opposite sides of each rib 3 form a virtual V whose point is directed towards the preferred rotation direction (marked by the arrow R) of the tire provided with the tread.

Tires provided with a tread according to the description just given were subjected to a comparative rolling test to compare them with a control tire which differed only in that its incisions had an inclination that was constant within the thickness of the tread. Test conditions were: mean load 3500 kg, inflation pressure 8.5 bar; mean speed 80 km/h. The tires provided with a tread according to the invention showed an irregular wear life 20% longer than that of the tires taken as controls.

Figure 3:
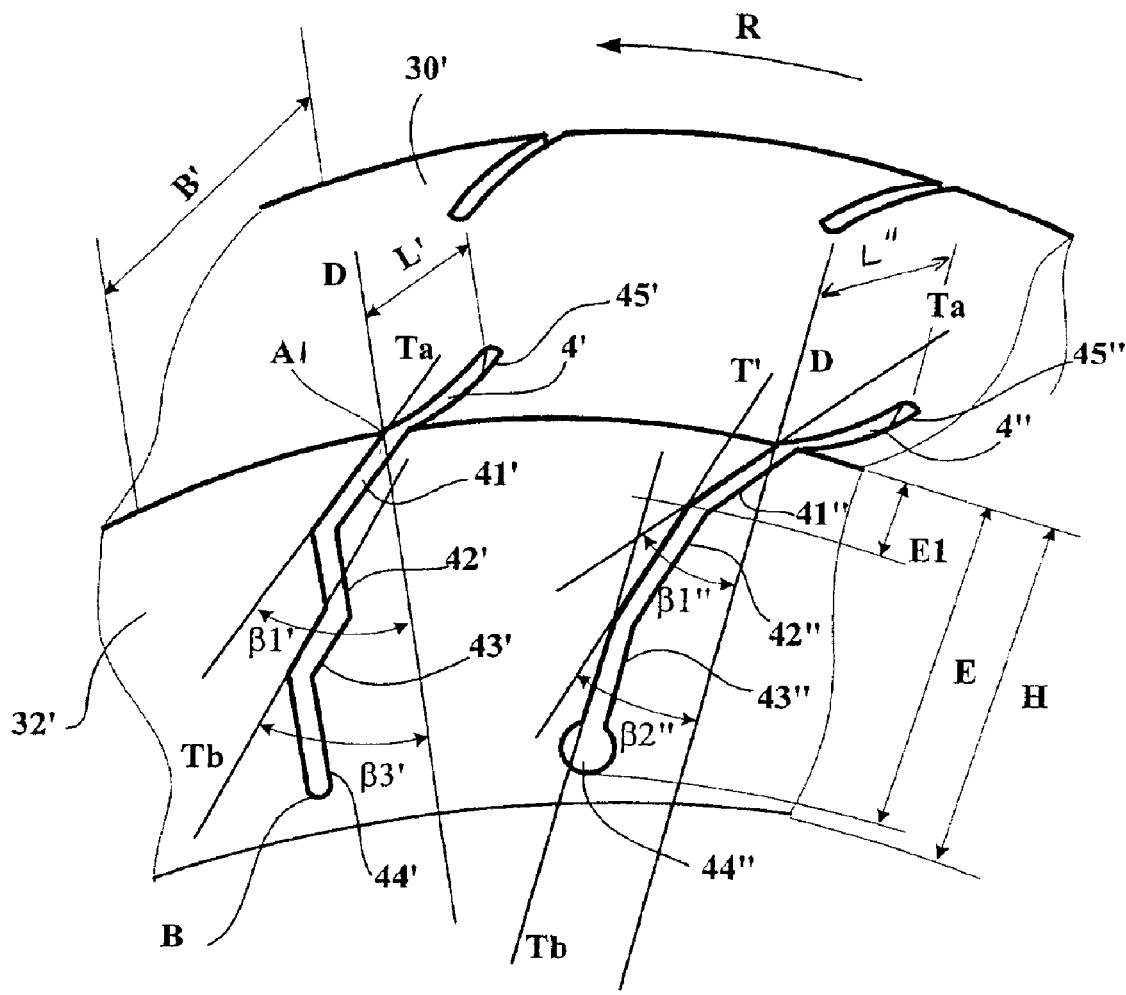
FIG. 3 shows a sectional view of a variant of a tread according to the invention.

FIG. 3 shows a partial perspective view of a rib of a tread according to the invention. This rib has a plurality of incisions 4' and 4" which alternate on the same edge and are distributed regularly in the circumferential direction. A first set of incisions 4', viewed in cross-section in a plane perpendicular to the rotation axis of the tire and in particular on the side face 32' that can be seen in FIG. 3, comprise a succession of four rectilinear traces 41', 42', 43', 44' of equal length. The first trace 41' follows the line Ta that makes an angle of β1' with the line D perpendicular to the rolling surface at the point A1 where the incision intersects the rolling surface in the section plane considered. This first trace 41' is extended by a second trace 42' essentially parallel to the direction of the line D. The second rectilinear trace 42' is extended by a third trace 43' that follows a line Tb which forms an angle β3' different from zero and smaller than the angle β1' of the first trace 41'. The fourth rectilinear trace 44' is parallel to the line D.

The other incision illustrated comprises three sections 41", 42", 43" of length equal to about one-third of the total depth E of the incision. The first two sections 41" and 42" form respectively angles β1" and β2" different from zero, angle β1" being larger than angle β2". The third section 43" makes an angle of 0° with the direction D perpendicular to the contact surface at the point where the incision intersects the face in the section plane considered.

To avoid any problems at the bottom of the incision, a widened portion 44" is formed at the end of the third section.

In the case of the incisions shown in FIG. 3, the traces 45' and 45" of the incisions on the contact surface of the rib have a curvilinear geometry, the angle made by the tangents to these traces relative to a transverse direction at the point of intersection with the edge of the rib being different from 0°.

Preferably, the mean length L', L" of the traces of the incision 4', 4", respectfully, on the rolling surface 30' is at least equal to 10% and at most equal to 35% of the width B' of the rib, so as to obtain a significant improvement of the irregular wear affecting the edges of the ribs without at the same time having an adverse effect on the average regular wear.

Of course, each incision shown and described in the various examples can be used alone or in combination on one side or on both sides of a rib.

Advantageously, the inclination variations of a given incision in several section planes perpendicular to the rotation axis are different from one section plane to another.

The invention is not limited only to the examples described, and various modifications may be applied by those familiar with the field without departing from its scope.

What is claimed is:

1. A tread for a tire intended for fitting on the front axle of a heavy vehicle, said tire having a preferred rolling direction and comprising a radial carcass reinforcement covered by a crown reinforcement, said tread comprising:

a plurality of grooves of substantially circumferential orientation and of depth H that delimit ribs of width B';

each rib having a contact surface intended to be in contact with the road and two side faces that intersect the contact surface to form two edges;

at least one of the ribs being circumferentially continuous and provided close to each of its edges with a plurality of circumferentially spaced incisions whose width is smaller than 1.5 mm and whose depth E is at least equal to 40% of the depth H of the grooves;

wherein the mean length L of each incision is at least equal to 10% and at most equal to 35% of the width B' of said at least one rib;

said incisions opening onto the contact surface of said at least one rib and being essentially parallel to one another and having, when viewed in cross-section in a plane perpendicular to the rotational axis of the tire, a mean inclination α different from zero relative to the direction perpendicular to the rolling surface (S) of the tread when new, such that the resultant force exerted on the tread by a road, during rolling of the tread in the zone of contact with the road, tends to straighten the incisions towards zero mean inclination relative to said perpendicular direction;

each incision in a given rib, when viewed in a section plane perpendicular to the rotational axis of the tire and relative to a perpendicular to the contact surface of said given rib at the point where said incision intersects said contact surface, has an inclination which varies within the thickness of the tread; and each incision is inclined relative to said perpendicular, at its point of intersection with the rolling surface when new, at an angle β1, the angle β1 being larger than the angle α, and at an angle β2 at the point of the incision furthest inside the tread, the angle β2 being smaller than the angle α, the point of said incision furthest inside the tread being located, relative to said perpendicular, such that it is ahead of the point of the incision located on the contact surface of the rib.

2. A tread according to claim 1, wherein each incision, formed in a rib, opens onto a side face of said rib.

3. A tread according to claim 2, wherein the mean inclination α is at least equal to 5° and at most equal to 15°.

4. A tread according to claim 3, wherein the angle β1 is at least equal to 5° and at most equal to 15°.

5. A tread according to claim 4, wherein, when viewed in cross-section and at the point of the incision furthest inside the tread, the angle β2 is at most equal to 5°.

6. A tread according to claim 2, wherein, on each rib provided with incisions whose inclination varies with depth, said incisions are distributed regularly in the circumferential direction spaced at an interval p equal to at least 4 mm and at most 10 mm.

7. A tread according to claim 2, wherein each incision whose inclination varies with its depth has, starting from the rolling surface when new, a zone whose inclination is at least equal to 10°, which extends over at most one-third of the depth of the incision.

8. A tread according to claim 2, wherein the trace on the contact surface of the incisions whose inclination varies with depth, has an inclination of angle γ measured relative to the transverse direction, which varies between the point of intersection with the edge and the transversely innermost point.

* * * * *